US009212971B2

(12) United States Patent
Oesselke et al.

(10) Patent No.: US 9,212,971 B2
(45) Date of Patent: Dec. 15, 2015

(54) OXYGEN SENSOR REGENERATION

(71) Applicant: Robert Bosch GmbH, Stuttgart (DE)

(72) Inventors: Ralf Oesselke, Knittlingen (DE); Chris Allumi, Novi, MI (US); Dave G. Lutz, Sterling Heights, MI (US)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 13/921,512

(22) Filed: Jun. 19, 2013

(65) Prior Publication Data

US 2014/0047912 A1 Feb. 20, 2014

Related U.S. Application Data

(60) Provisional application No. 61/684,419, filed on Aug. 17, 2012.

(51) Int. Cl.
*F02D 41/14* (2006.01)
*G01M 15/10* (2006.01)
*F01N 11/00* (2006.01)
*F02D 41/20* (2006.01)

(52) U.S. Cl.
CPC ......... *G01M 15/104* (2013.01); *F02D 41/1454* (2013.01); *F02D 41/1494* (2013.01); *F01N 11/007* (2013.01); *F02D 2041/2027* (2013.01)

(58) Field of Classification Search
CPC ............ F02D 41/1494; F02D 41/1454; F02D 2041/2027; F02D 41/06; G01N 27/417; G01N 27/419; G01N 27/407; G01N 27/4071; G01N 27/4118
See application file for complete search history.

(56) References Cited

U.S. PATENT DOCUMENTS

| | | | |
|---|---|---|---|
| 4,365,604 A | 12/1982 | Sone | |
| 4,620,437 A | 11/1986 | Takami et al. | |
| 5,137,616 A | 8/1992 | Poor et al. | |
| 5,526,280 A | 6/1996 | Consadori et al. | |
| 5,596,975 A * | 1/1997 | Thomas et al. | 123/686 |
| 6,254,765 B1 * | 7/2001 | Diehl | 205/785 |
| 6,280,605 B1 * | 8/2001 | Jach et al. | 205/784.5 |
| 6,336,354 B1 | 1/2002 | Suzuki et al. | |
| 6,341,599 B1 * | 1/2002 | Hada et al. | 123/688 |
| 6,592,731 B1 * | 7/2003 | Lawless | 204/425 |
| 6,649,041 B2 | 11/2003 | Hashimoto et al. | |
| 7,305,299 B2 | 12/2007 | Yasui et al. | |
| 7,337,772 B2 | 3/2008 | Yasui et al. | |

(Continued)

FOREIGN PATENT DOCUMENTS

JP        11083791 A  *  3/1999  ........... G01N 27/409

*Primary Examiner* — David A Rogers
(74) *Attorney, Agent, or Firm* — Michael Best & Friedrich LLP

(57) ABSTRACT

Methods and systems for heating an oxygen sensor. One system includes an oxygen sensor and controller. The oxygen sensor includes a heater and an electro-chemical measurement cell and a heater. The controller is coupled to the oxygen sensor and is configured to, for each of a plurality of stages of a regeneration process, determine a predetermined temperature for heating the oxygen sensor to, determine a predetermined internal resistance value of an electro-chemical measurement cell of the oxygen sensor associated with the predetermined temperature, apply a pulse-width-modulated signal to the heater, and monitor an internal resistance of the measurement cell while applying the pulse-width-modulated signal to the heater to determine when the internal resistance of the measurement cell reaches the predetermined internal resistance.

18 Claims, 8 Drawing Sheets

(56) References Cited

U.S. PATENT DOCUMENTS

| | | | |
|---|---|---|---|
| 2001/0050229 A1* | 12/2001 | Schnaibel et al. | 204/421 |
| 2005/0252771 A1* | 11/2005 | Wiedenmann et al. | 204/426 |
| 2007/0079597 A1* | 4/2007 | Wang et al. | 60/277 |
| 2008/0178856 A1* | 7/2008 | Adams et al. | 123/697 |
| 2009/0116534 A1* | 5/2009 | Tabery et al. | 374/45 |
| 2009/0145778 A1* | 6/2009 | Allmendinger | 205/789 |
| 2009/0301180 A1* | 12/2009 | Reutiman et al. | 73/114.71 |
| 2011/0036069 A1* | 2/2011 | Hahn | 60/273 |
| 2011/0167797 A1* | 7/2011 | Gibson et al. | 60/274 |
| 2011/0265551 A1* | 11/2011 | Hopka et al. | 73/23.31 |
| 2013/0000678 A1* | 1/2013 | Hocken et al. | 134/20 |
| 2013/0256296 A1* | 10/2013 | Hocken et al. | 219/497 |

* cited by examiner

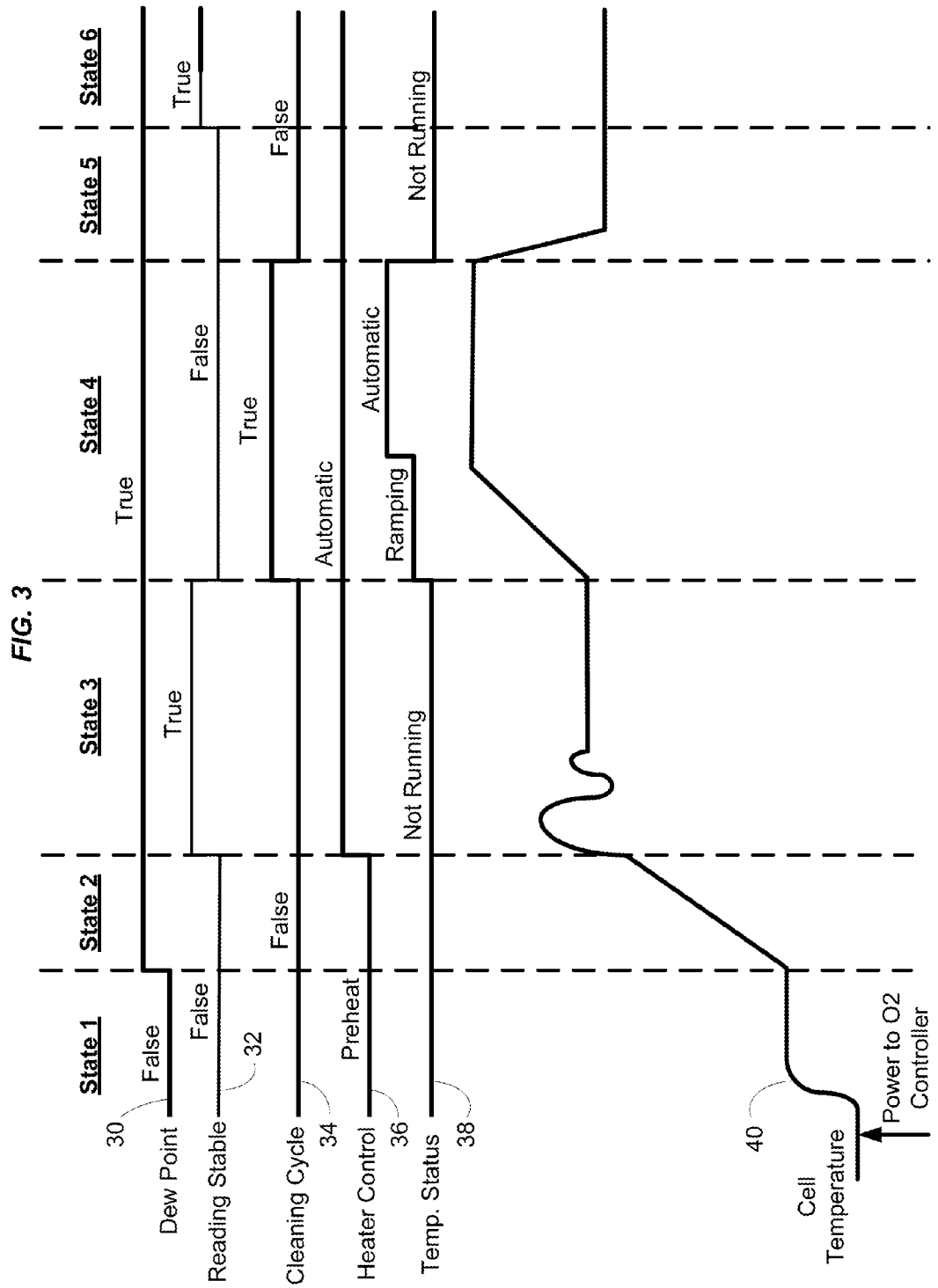

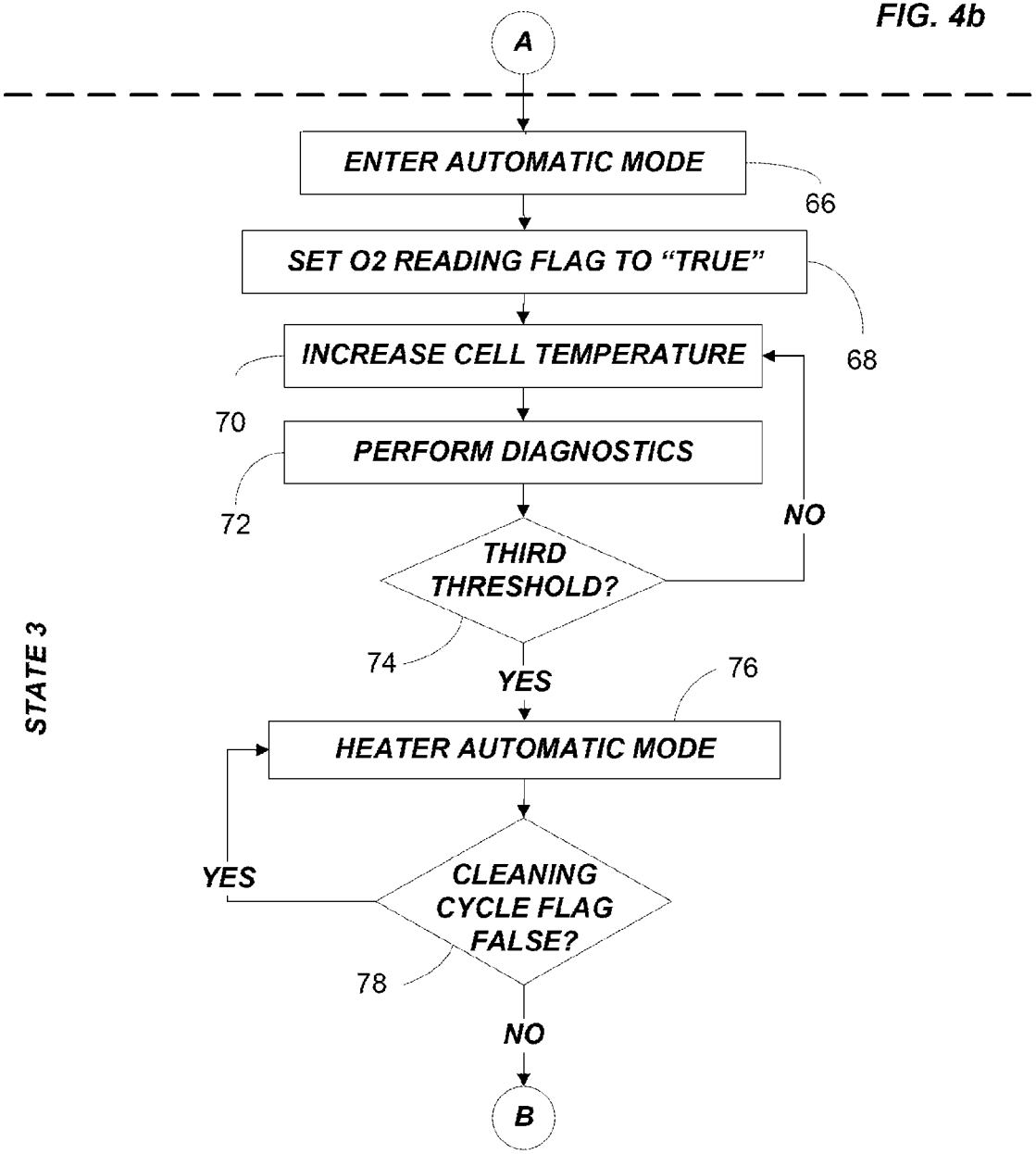

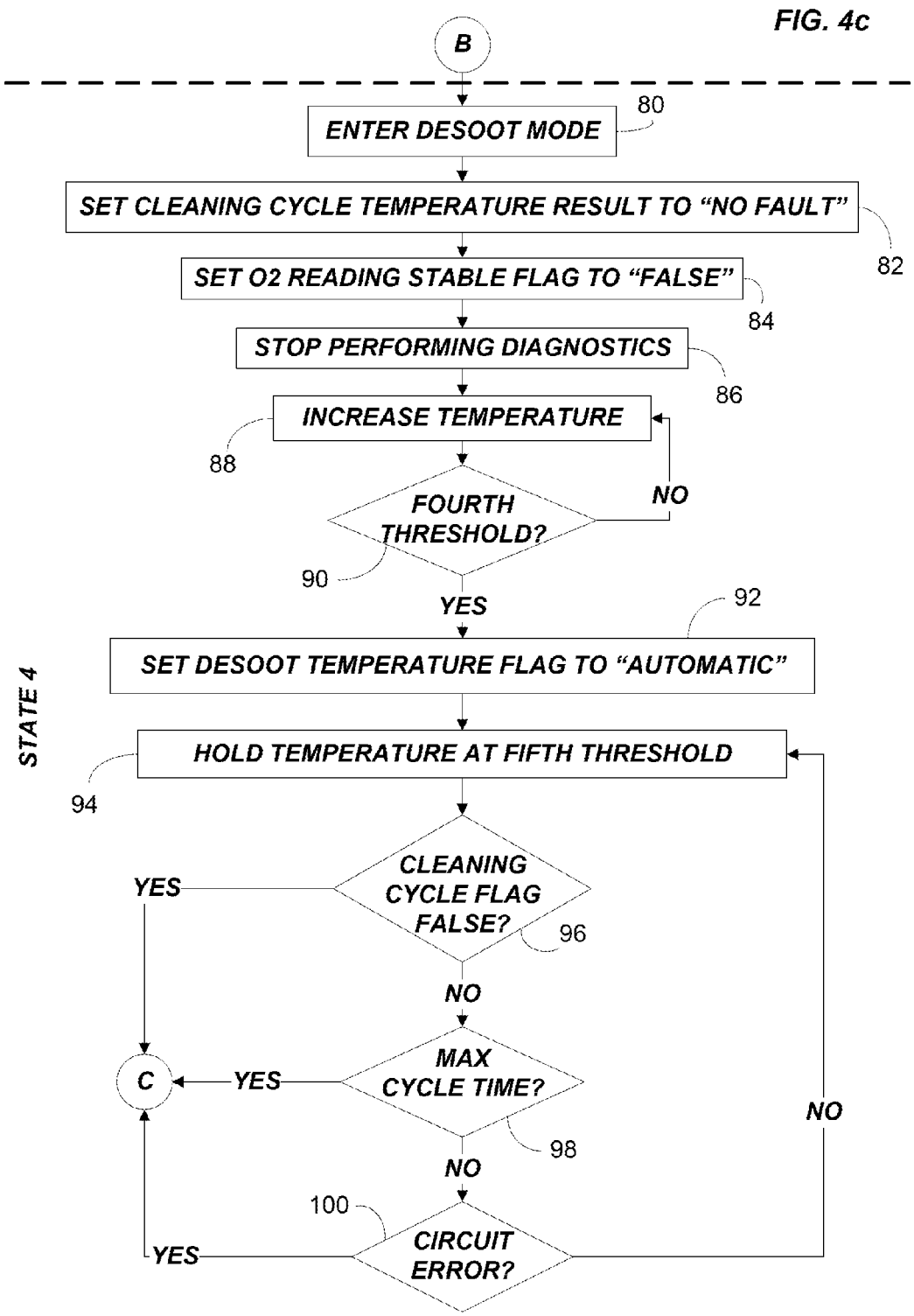

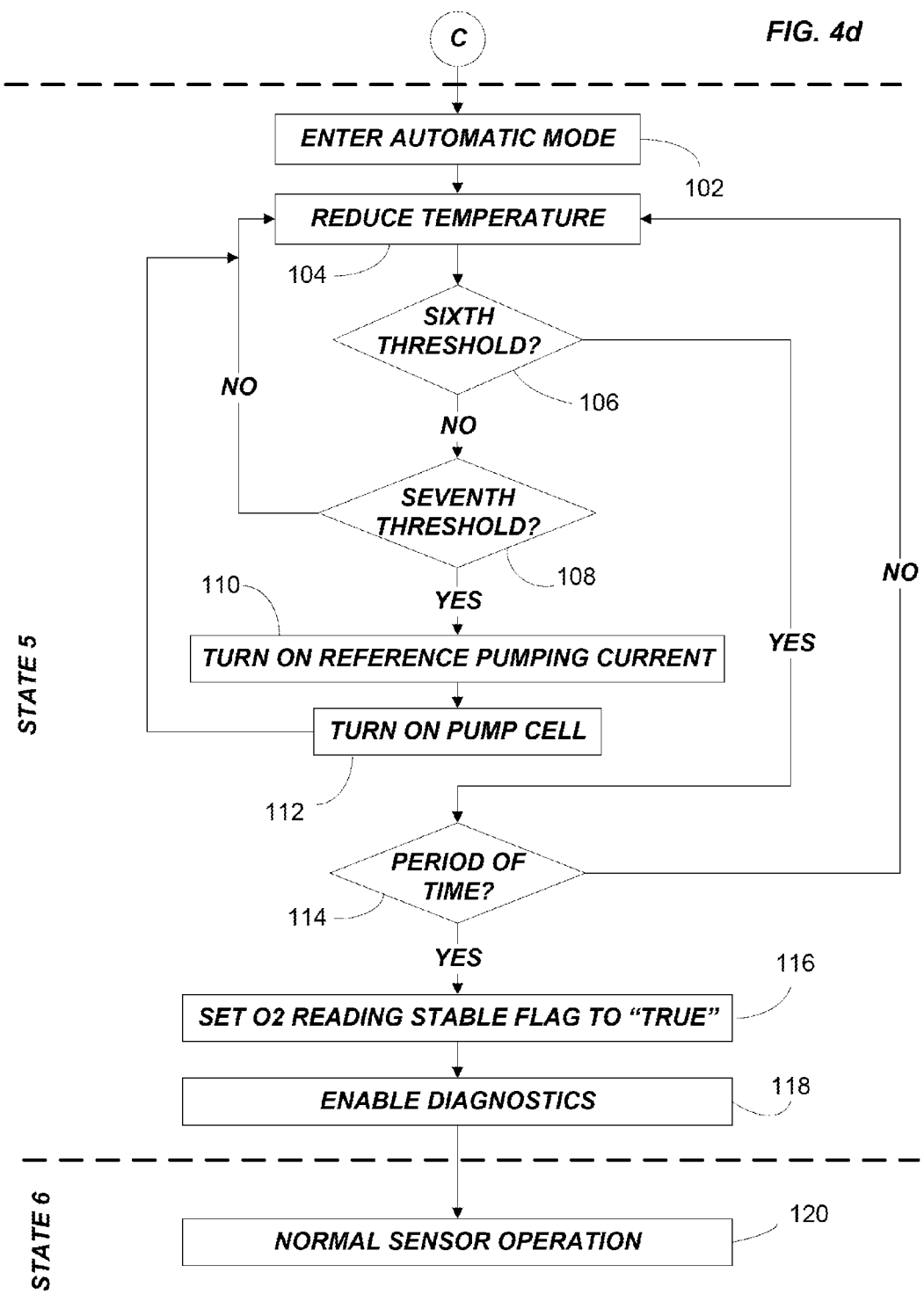

OXYGEN SENSOR REGENERATION

RELATED APPLICATIONS

The present application claims priority to U.S. Provisional Application No. 61/684,419, filed Aug. 17, 2012, the entire contents of which are hereby incorporated by reference.

FIELD

Embodiments of the invention relate to methods and systems for regenerating an oxygen (or "O2") sensor.

BACKGROUND

O2 sensors are used in the exhaust systems of internal combustion engines and provide information regarding the ratio of air to fuel being supplied to the engine. In general, internal combustion engines need a specific air-to-fuel ratio (or ratio range) to operate correctly. When the ratio is less than desired, not all fuel in the air-fuel mixture is burned or combusted. This situation is referred to as a rich mixture or rich condition and has a negative impact on exhaust emissions. When the air-fuel ratio is higher than desired, excess oxygen is present in the air-fuel mixture. This situation is referred to as a lean mixture or lean condition. When an engine burns lean, engine performance may decrease and, in some cases, may cause engine damage and have a negative impact on exhaust emissions.

Over time, contaminants (such as soot) build up on O2 sensors. If these contaminants are not removed, the sensors will not operate properly. One way to remove the contaminants is to heat the sensor (using an electric heating element contained within the sensor) so that the contaminants are burned off. However, overheating the sensor to burn off contaminants can damage the sensor.

SUMMARY

In one embodiment, the invention provides methods and systems for heating an O2 sensor to a temperature where contaminants are burned off, but damage to the sensor is eliminated or reduced. In particular, the temperature that the sensor is heated to is based on an internal resistance of the sensor at the time the heating is carried out. Heating of the sensor is often referred to as an "increased temperature cycle" or a "cleaning cycle," and the overall process of removing contamination is referred to as "sensor regeneration." Heating occurs as a result of applying a pulse-width-modulated ("PWM") voltage signal to the sensor (via a heating element located in the sensor). The PWM signal is created based on an algorithm or calculation performed in a controller (such as a microprocessor). The algorithm uses a software-chosen internal resistance value of the O2 sensor (i.e., the Nernst cell included in the sensor) associated with a desired temperature (for example, from a look-up table).

For example, in one embodiment, to heat the sensor to a predetermined temperature, the controller creates a PWM signal to change the internal resistance of the O2 sensor to a predetermined value, which, under ideal conditions (e.g., the sensor is new and the engine is operating at its normal temperature), correlates to a particular temperature. In other words, it is known that if a PWM signal of a certain duty cycle is applied (or provided) to the sensor, the temperature of the sensor will rise to a certain temperature when the internal resistance of the sensor reaches a predetermined value. Accordingly, the controller uses a look-up table that maps a desired temperature to a predetermined internal resistance value. The controller then applies a PWM signal to the sensor and monitors the internal resistance of the sensor. Until the internal resistance of the sensor reaches the internal resistance value specified in the look-up table, the controller continues applying the PWM signal and can modify the PWM signal to properly reach the desired internal resistance value.

For example, one embodiment of the invention provides a method of heating an oxygen sensor. The method includes determining, by a controller, a predetermined temperature for heating the oxygen sensor to and determining, by the controller, a predetermined internal resistance value of an electro-chemical measurement cell of the oxygen sensor associated with the predetermined temperature. The method further includes applying, by the controller, a pulse-width-modulated signal to a heater included in the oxygen sensor, and monitoring, by the controller, an internal resistance of the measurement cell while applying the pulse-width-modulated signal to the heater to determine when the internal resistance of the measurement cell reaches the predetermined internal resistance.

Another embodiment of the invention provides a system for heating an oxygen sensor. The system includes an oxygen sensor and a controller. The oxygen sensor includes a heater and an electro-chemical measurement cell. The controller is coupled to the oxygen sensor and is configured to, for each of a plurality of stages of a regeneration process, determine a predetermined temperature for heating the oxygen sensor to, determine a predetermined internal resistance value of an electro-chemical measurement cell of the oxygen sensor associated with the predetermined temperature, apply a pulse-width-modulated signal to the heater, and monitor an internal resistance of the measurement cell while applying the pulse-width-modulated signal to the heater to determine when the internal resistance of the measurement cell reaches the predetermined internal resistance.

Other aspects of the invention will become apparent by consideration of the detailed description and accompanying drawings.

BRIEF DESCRIPTION OF THE DRAWINGS

FIG. 3 is a timing diagram showing the temperature of an O2 sensor during various states of a sensor regeneration method performed by the O2 controller of FIGS. 1a and 1b.

FIGS. 4a-d are flow charts illustrating a sensor regeneration method performed by the O2 controller of FIGS. 1a and 1b.

DETAILED DESCRIPTION

Figure 1A:
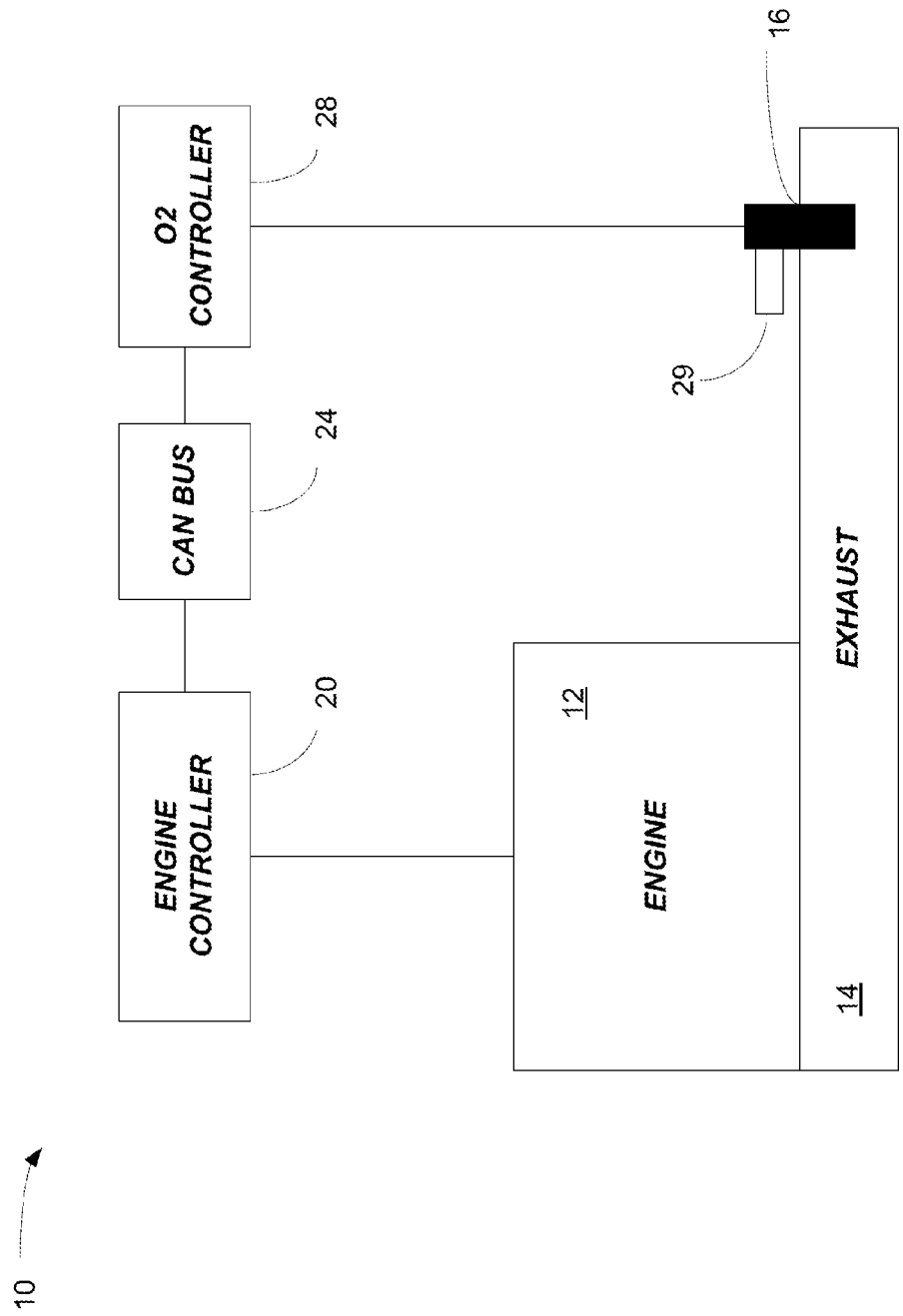
FIG. 1a schematically illustrates a system for performing sensor regeneration including an internal combustion engine and an O2 controller.
Figure 1B:
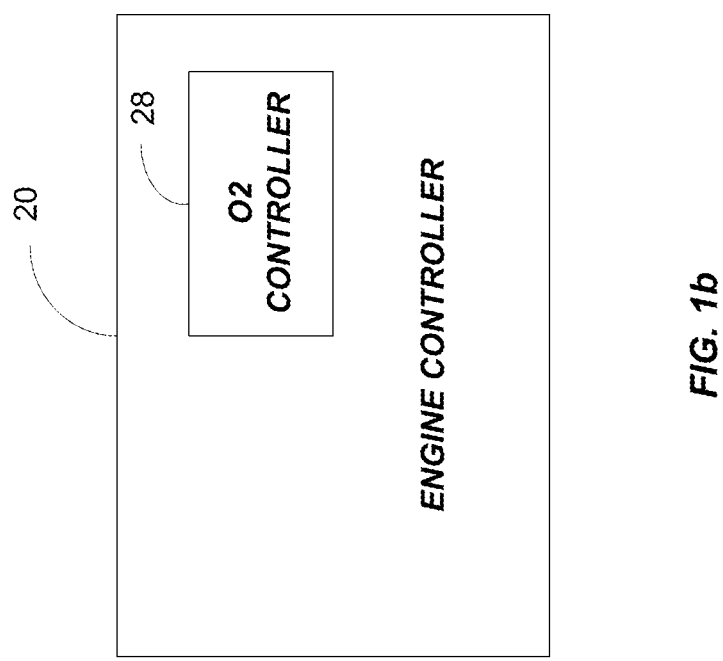
FIG. 1b schematically illustrates an alternative system for performing sensor regeneration including an internal combustion engine and an engine controller that includes an O2 controller.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways FIG. 1a illustrates a system 10 having an engine 12, an exhaust system 14, and an O2 sensor 16 (including a heater) positioned in the exhaust system 14. The engine 12 is controlled by an engine controller 20. In the embodiment shown, controller 20 communicates with other vehicle systems and controllers via a vehicle bus 24, such as a controller area network ("CAN") bus. The O2 sensor 16 is controlled by an O2 controller 28, and the O2 controller 28 is connected to the bus 24. Alternatively as illustrated in FIG. 1b, in some embodiments, the functionality of the O2 controller 28 is embodied within the engine controller 20. The system 10 also includes a resistance detecting unit 29. The resistance detecting unit 29 configured to detect an internal resistance of the O2 sensor 16 and transmit the detected resistance to the O2 controller 28 (e.g., over the bus 24). As resistance detecting units are well-known in the art, they will not be described in detailed herein.

The O2 sensor 16 can include a solid-state electro-chemical measurement cell or unit that includes a pumping cell and a Nernst cell. The two electrodes positioned around the Nernst cell provide an output voltage corresponding to the quantity of oxygen in a measurement cavity of the sensor 16. During non-regenerative operation, the O2 controller 28 increases or decreases the pumping current through the pumping cell to increase or decrease the quantity of oxygen in the exhaust system 14. Accordingly, the measured pumping current is directly dependent on the quantity of oxygen in the exhaust system 14. A heater included in the sensor 16 heats the measurement cell. To heat the cell, the O2 controller 28 provides a pulse-width-module ("PWM") signal to the heater. The amount of heat generated by the heater and applied to the cell is based on the voltage level of the PWM signal.

Figure 2:
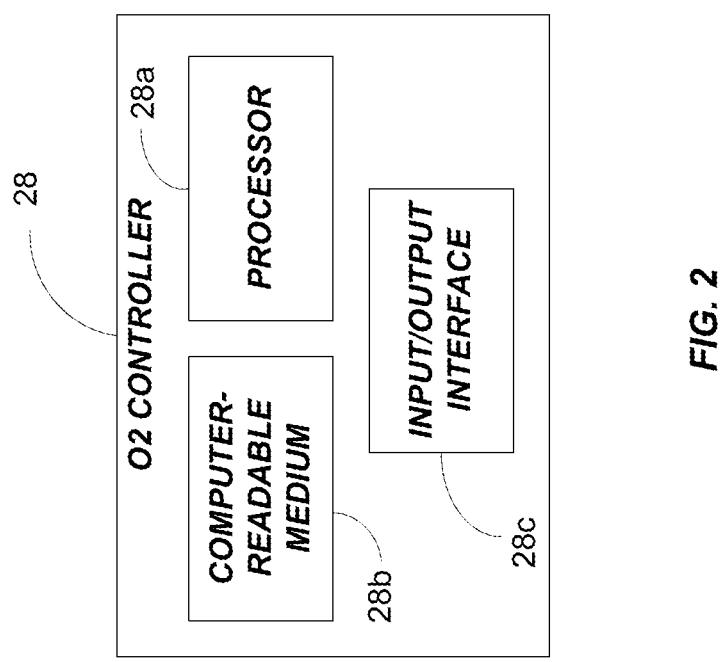
FIG. 2 schematically illustrates the O2 controller of FIGS. 1a and 1b.

As illustrated in FIG. 2, the O2 controller 28 includes a processor 28a, non-transitory computer-readable medium 28b, and an input/output interface 28c. The computer-readable medium 28b can include random access memory ("RAM") and/or read-only memory ("ROM"). The input/output interface 28c transmits and receives information over the bus 24. The processor 28a receives information (e.g., from the medium 28b and/or the input/output interface 28c) and processes the information by executing one or more instructions or modules. The instructions or modules are stored in the computer-readable medium 28b. The processor 28a can also store information (e.g., information received from the bus 24 or information generated by instructions or modules executed by the processor 28a) to the medium 28. It should be understood that although only a single processor, input/output interface, and computer-readable medium module are illustrated in FIG. 2, the O2 controller 28 can include multiple processing units, memory modules, and/or input/output interfaces.

The instructions stored in the computer-readable medium 28b provide particular functionality when executed by the processor 28a. In general, the instructions, when executed by the processor 30 perform a sensor regeneration method (sometimes referred to as a desoot cycle) for the O2 sensor 16. The sensor regeneration method can be initiated or triggered after a predetermined number of specific events or driving cycles occur. These events may include a "Desoot Mode" of a particle filter of a engine, actual sensor performance (such as a measured sensor performance degradation due to sensor contamination), and/or a count of the periods of time during which the O2 sensor signal is not required (in other words, there will be times during the vehicle life when information from the O2 sensor is not used). Accordingly, during the majority of the time that the vehicle is being operated, the O2 sensor is operated in a "Normal Mode" that is designed for optimum performance where only the occurrence of particular events trigger regeneration.

FIG. 3 is a timing diagram associated with the sensor regeneration method carried out by the O2 controller 28 to clean or regenerate the O2 sensor 16 with reduced risk of damage due to overheating. In one embodiment, the method includes five states or stages. An illustrated sixth state or stage represents a "Normal Mode" of operation of the O2 sensor 16. The line 30 included in the timing diagram illustrates a value of a Dew Point Flag set and controlled by the engine controller 20. The line 32 illustrates a value of a Reading Stable Flag set and controlled by the O2 controller 28. The line 34 illustrates a value of a Desoot Cleaning Cycle Flag set and controlled by the engine controller 20. The line 36 illustrates a value of a sensor heater control signal set and controlled by the O2 controller 28. The line 38 illustrates an O2 Sensor Desoot Cleaning Cycle Temperature Status set and controlled by the O2 controller 28. The line 40 illustrates a temperature of the O2 sensor 16 (i.e., the Nernst cell) during the sensor regeneration method.

The temperatures described below for the cell are for a new (e.g., uncontaminated) O2 sensor 16. After about 100 hours of use, an O2 sensor is considered aged, which increases the internal resistance of Nernst cell. As a consequence, an aged Nernst cell has to be heated to a higher temperature to reach the same internal resistance of a new Nernst cell. Accordingly, once an O2 sensor is considered aged, the O2 controller 28 heats the O2 sensor 16 to a different temperature than when the sensor 16 is considered new (e.g., based on a different value retrieved from a look-up table or other data storage mechanism). For example, in some embodiments, the O2 controller 28 heats an aged sensor 16 to a temperature that is about 100° C. higher than the new sensor temperature.

It should be understood that for each temperature threshold described below, the controller 28 accesses one or more look-up tables to create the PWM heating signal. In particular, the look-up table maps a desired temperature to an internal resistance value of the Nernst cell. Generally, the look-up table maps temperatures to internal resistance values where the higher the desired temperature, the lower the predetermined internal resistance value. However, it should be understood that the internal resistance values (and the associated temperatures and voltage levels) included in the table can vary based on characteristics of the sensor 16, the exhaust system 14, the type of vehicle containing the sensor 16, etc.

After determining the desired internal resistance value from the look-up table, the O2 controller 28 applies the PWM signal to the heater. In some embodiments, the characteristics of the PWM signal (e.g., voltage) are based on the particular stage of the regeneration cycle and/or the desired internal resistance value. However, while the PWM signal is applied to the heater, the O2 controller 28 monitors the internal resistance of the Nernst cell (i.e., through the resistance detection unit 29) to determine when the internal resistance reaches the value specified in the look-up table. Until the internal resistance of the Nernst cell reaches the specified value, the O2 controller 28 can also adjust the PWM heating signal as needed to reach the specified value. For example, the O2 controller 28 can increase the voltage of the PWM heating signal if the sensor 16 is too cold (i.e., has an internal resistance value that is too high).

Figure 4A:
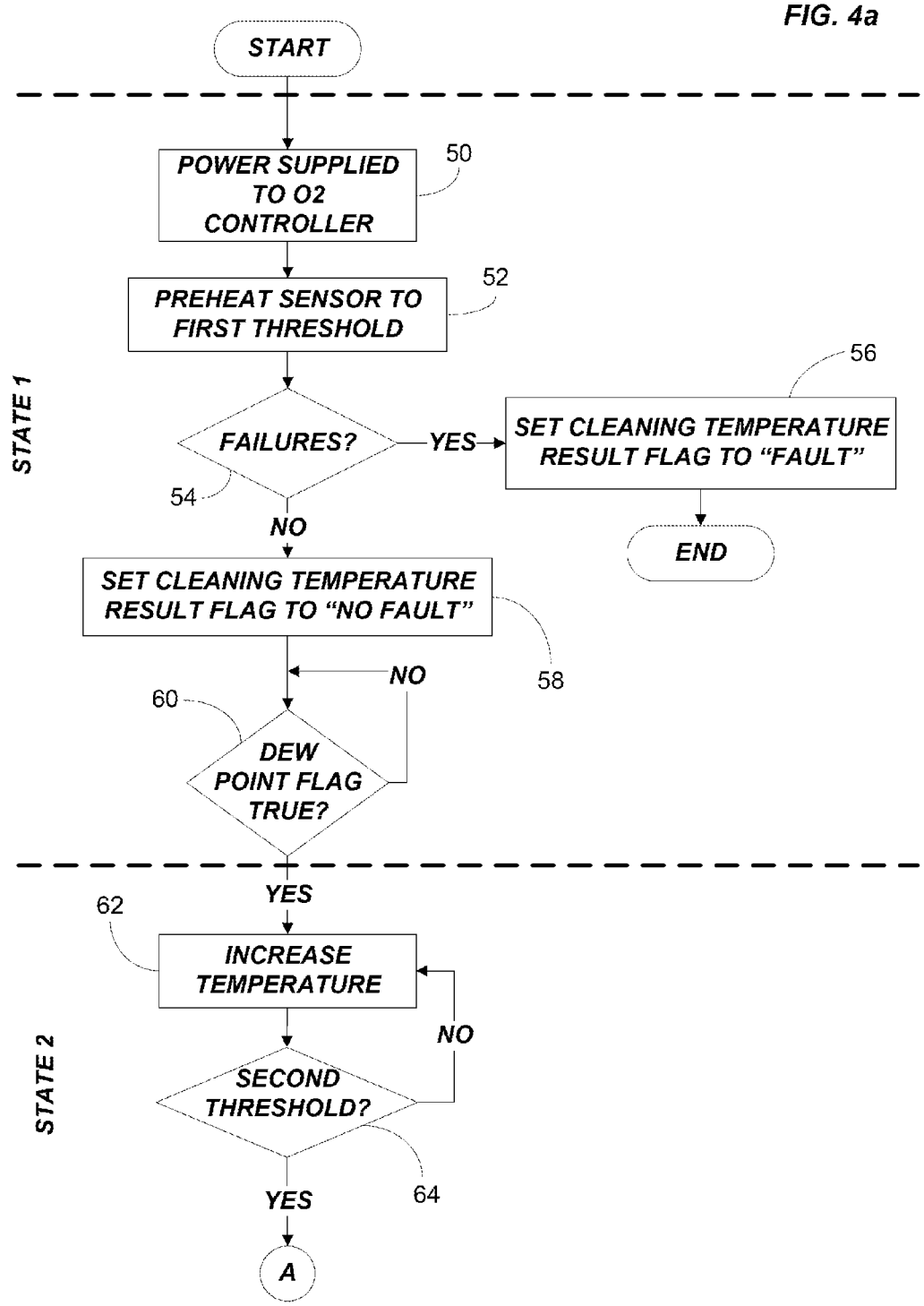

FIGS. 4a-d are flow charts illustrating the sensor regeneration method performed by the O2 controller 28. As illustrated in FIGS. 3 and 4a, the method begins when power is applied to the O2 controller 28 (at block 50). In other embodiments, such as when the hardware configuration illustrated in FIG. 1 is used, the sensor regeneration method is initiated when the O2 controller 28 receives a Start Flag from the engine controller 20 (e.g., as part of a CAN message). During the first stage of the method (State 1), the O2 controller 28 preheats the sensor 16 (at block 52) (e.g., after an initialization period). For example, the O2 controller 28 preheats the sensor 16 by providing a Preheat Signal to the heater included in the O2 sensor 16. The Preheat Signal can include a PWM signal having a 2% duty cycle. In some embodiments, preheating the sensor 16 raises the temperature of a new O2 sensor 16 (i.e., the Nernst cell) from ambient air temperature to a first predetermined temperature threshold (e.g., approximately 200° C.). In some embodiments, the sensor 16 is preheated to test the sensor 16 for proper heating operation and prepare the sensor 16 for further heating as part of sensor regeneration. For example, if any faults occur during preheating of the sensor 16 (at block 54), the O2 controller can set the Cleaning Cycle Temperature Result Flag to "Fault" (at block 56), which can cause the regeneration method to end. Alternatively, the Result Flag can be set to "No Fault" (at block 58).

The second stage (State 2) starts when the Dew Point Flag is set to "True" (at block 60). The Dew Point Flag is controlled by the engine controller 20 and signals that the O2 sensor heater may be turned on without risk of moisture damaging the O2 sensor's ceramic (i.e., no moisture has been detected, such as on the sensor 16 or within the exhaust system 14 generally). Therefore, during the second stage, the heater increases the voltage of the PWM signal (at block 62). In some embodiments, the heater increases the voltage of the PWM signal at a rate of about 0.65 volts per second (e.g., approximately 0.5 to approximately 0.8 volts per second).

As illustrated in FIG. 4b, the third stage (State 3) starts when the Nernst cell of the O2 sensor 16 reaches a second predetermined temperature threshold (e.g., approximately 750° C.) (at block 64). At this point, the O2 controller 28 enters an Automatic Mode that performs closed-loop temperature control (at block 66) and sets the O2 Reading Stable Flag to "True" (at block 68) (see FIG. 4b). During the third stage, the O2 controller 28 continues heating the Nernst cell to a third predetermined temperature threshold (e.g., approximately 780° C.) (at block 70) while performing diagnostic checks on the sensor 16 (at block 72). As illustrated in FIG. 3, while reaching the third predetermined temperature, the temperature of the cell may vary above and below the third predetermined temperature threshold. In some embodiments, the O2 controller 28 remains in the Automatic Mode until the Dew Point Flag is set to "False," power to the O2 controller 28 is cycled, or there is a diagnostic fault with the sensor 16.

After reaching the third temperature threshold (at block 74), the heater also enters an Automatic Mode where cell temperature is maintained at the third predetermined temperature threshold (at block 76). The heater remains in the Automatic Mode until the O2 controller 28 enters and subsequently exits the Desoot Mode (i.e., while the Desoot Cleaning Cycle Flag is set to "False" and while the Desoot Cleaning Cycle Flag is set to "True" but the Desoot Time Exceed Flag is set to "False").

The fourth stage (State 4) begins when the engine controller 20 sets the Desoot Cleaning Cycle Flag to "True" (at block 78), which puts the O2 controller 28 into a Desoot Mode (at block 80) (see FIG. 4c). During the fourth stage, the O2 controller 28 sets the O2 Sensor Cleaning Cycle Temperature Result to "No Fault" (at block 82), sets the O2 Reading Stable Flag to "False" (at block 84), and stops running logical and/or rational diagnostics on the sensor 16 (at block 86). In some embodiments, the O2 controller 28 also optionally turns off a reference pumping current and a pumping cell current to prevent or limit damages to the O2 sensor 16 during the high temperature associated with the Desoot Mode. In particular, the electrodes of the sensor 16 can be overloaded by a higher pumping current associated with a lowered pumping cell resistance.

The heater PWM is then increased (e.g., at 0.3 volts per second) (at block 88) until the Nernst cell reaches a fourth predetermined temperature threshold (e.g., approximately 855° C., which corresponds to an internal resistance of approximately 185Ω for one type of O2 sensor (i.e., the Bosch LSU 4.9 O2 sensor)) (at block 90). The O2 controller 28 then sets the Desoot Temperature Flag to "Automatic" (at block 92), and the sensor 16 continues heating the Nernst cell to hold the cell at a fifth predetermined temperature threshold (e.g., approximately 870° C., which corresponds to an internal resistance of approximately 170Ω for the Bosch LSU 4.9 O2 sensor) (at block 94), which cleans the sensor 16 by burning contaminants. In some embodiments, if the temperature during the cleaning process drops below the fourth predetermined temperature threshold (i.e., approximately 855° C.) for a predetermined period of time (e.g., five or more seconds), the O2 controller 28 can set the Desoot Temperature Flag to "Ramping" and the Desoot Temperature Not Maintained Flag while the sensor 16 continues to heat the cell to the fifth predetermined temperature threshold.

The cleaning can be performed for a predetermined period of time. For example, if the Desoot Cleaning Cycle Flag is set to "True" by the engine controller 20 for longer than a predetermined time period (e.g., approximately six minutes) during the Desoot Mode, the O2 controller 28 sets the Maximum Desoot Time Exceeded Flag to "True" and returns to the Automatic Mode. In some embodiments, the O2 controller 28 is not allowed to enter the Desoot mode again until the Desoot Cleaning Cycle Flag has been set to "False."

Similarly, if the O2 sensor 16 (i.e., an interface circuit) detects a circuit error on one of the oxygen sensor lines or the heater, the O2 controller 28 sets the Desoot Stopped Module Flag and returns to the Automatic Mode. In some embodiments, in this situation, the O2 controller 28 is not allowed to enter the Desoot Mode again until the Desoot Cleaning Cycle Flag has been set to "False" and the circuit error has been corrected.

In some embodiments, the Desoot Cleaning Cycle Flag is only set to "True" if the O2 Reading Stable Flag is set to "True," such that the Desoot Cleaning Cycle Flag is ignored when the O2 controller 28 is in any mode other than a normal mode. In some embodiments, the default state of the Desoot Cleaning Cycle Flag is "False" (i.e., sensor cleaning is turned off).

Accordingly, the fifth stage (State 5) starts when the engine controller 20 sets the Desoot Cleaning Cycle Flag to "False" (at block 96), the Maximum Desoot Time Exceeded Flag is set to "True" (at block 98), or the Desoot Stopped Module Flag is set (e.g., indicating a circuit error) (at block 100), each of which causes the O2 controller 28 to return to the Automatic Mode (at block 102) (see FIG. 4d). If the Desoot Cleaning Cycle Flag is set to "False," the O2 controller 28 clears the Cleaning Cycle Temperature Result Flag. Otherwise, the O2 controller 28 sets the Cleaning Cycle Temperature Result Flag based on the condition that caused the exit of the Desoot Mode. During the fifth stage, the O2 controller 28 reduces the temperature of the sensor 16 (at block 104) until the cell temperature reaches a sixth predetermined temperature threshold (e.g., a temperature associated with Automatic Mode, such as approximately 780° C., which corresponds to an internal resistance value of approximately 300Ω for the Bosch LSU 4.9 O2 sensor) (at block 106). The time it takes to reduce the cell temperature depends on the exhaust gas temperature. In some embodiments, when the Nernst cell reaches a seventh predetermined temperature threshold (e.g., approximately 800° C., which corresponds to an internal resistance value of approximately 280Ω for the Bosch LSU 4.9 O2 sensor) (at block 108), the O2 controller 28 turns on the reference pumping current (at block 110), and, thereafter (e.g., approximately one second later), turns on the pumping cell (at block 112).

When the temperature of the Nernst cell reaches the sixth predetermined temperature threshold (at block 106) and the temperature is maintained for a predetermined period of time (e.g., approximately three seconds) (at block 114), the O2 controller 28 sets the O2 Reading Stable Flag to "True" (at block 116) and diagnostics performed by the O2 controller 28 are enabled (at block 118). The O2 controller 28 then enters a sixth stage (State 6) that includes normal operation of the O2 sensor 16 (i.e., detection of the air-fuel ratio) (at block 120).

Thus, the invention provides, among other things, improved regeneration of O2 sensors. In particular, embodiments of the invention map a desired temperature to a predetermined internal resistance value and then apply a PWM heating signal to the sensor's heater to change the internal resistance of the sensor to the predetermined internal resistance value. While the heating signal is applied, the internal resistance of the sensor is monitored and the heating signal is modified as needed until the internal resistance of the sensor reaches the predetermined value. It should be understood that the labels "first," "second," "third," etc. used in the present application are provided merely for ease of description and no order or importance is implied by the use of such labels. Also, the temperature thresholds described above are sample thresholds and the thresholds can vary based on the O2 sensor 16, the exhaust system 14, the engine 12, etc. Furthermore, it should be understood that in some embodiments one or more of the thresholds can have the same value (e.g., the third and sixth thresholds can have the same value).

Various features of the invention are set forth in the following claims.

What is claimed is:

1. A method of heating an oxygen sensor, the method comprising:
    (a) determining, by a controller, a predetermined temperature for heating the oxygen sensor to;
    (b) determining, by the controller, a predetermined internal resistance value of an electro-chemical measurement cell of the oxygen sensor associated with the predetermined temperature;
    (c) applying, by the controller, a pulse-width-modulated signal to a heater included in the oxygen sensor; and
    (d) monitoring, by the controller, an internal resistance of the measurement cell while applying the pulse-width-modulated signal to the heater to determine when the internal resistance of the measurement cell reaches the predetermined internal resistance; and
    repeating steps (a) through (d) in each of a plurality of stages of a regeneration process for the oxygen sensor.

2. The method of claim 1, wherein determining the predetermined internal resistance includes accessing a look-up table associating the predetermined temperature with the predetermined internal resistance.

3. The method of claim 1, further comprising modifying the pulse-width-modulated signal while monitoring the internal resistance of the measurement cell.

4. The method of claim 1, further comprising turning off a pumping cell included in the measurement cell before applying the pulse-width-modulated signal to the heater.

5. The method of claim 1, further comprising applying a second pulse-width-modulated signal to the heater to preheat the measurement cell to a second predetermined temperature.

6. The method of claim 5, wherein the second pulse-width-modulated signal has a duty cycle of approximately 2%.

7. The method of claim 5, further comprising applying a third pulse-width-modulated signal to the heater to increase a temperature of the measurement cell from the first predetermined temperature to a third predetermined temperature.

8. The method of claim 7, wherein applying the third pulse-width-modulated signal includes applying the third pulse-width-modulated signal to the heater when no moisture is detected around the oxygen sensor.

9. The method of claim 7, wherein the third pulse-width-modulated signal has a voltage level that increases at a rate of approximately 0.5 volts to approximately 0.8 volts per second.

10. The method of claim 7, wherein the third pulse-width-modulated signal has a voltage level that increases at a rate of approximately 0.3 volts per second.

11. The method of claim 5, further comprising applying a fourth pulse-width-modulated signal to the heater to increase a temperature of the measurement cell from the third predetermined temperature to a fourth predetermined temperature threshold.

12. A system for heating an oxygen sensor, the system comprising:
    the oxygen sensor, wherein the oxygen sensor includes a heater and an electro-chemical measurement cell and a heater; and
    a controller coupled to the oxygen sensor and configured to, for each of a plurality of stages of a regeneration process,
    determine a predetermined temperature for heating the oxygen sensor to,
    determine a predetermined internal resistance value of an electro-chemical measurement cell of the oxygen sensor associated with the predetermined temperature,
    apply a pulse-width-modulated signal to the heater, and
    monitor an internal resistance of the measurement cell while applying the pulse-width-modulated signal to the heater to determine when the internal resistance of the measurement cell reaches the predetermined internal resistance.

13. The system of claim 12, wherein the measurement cell includes a Nernst cell and a pumping cell.

14. The system of claim 13, wherein the pulse-width-modulated signal is based on an internal resistance of the Nernst cell associated with the predetermined temperature.

15. The system of claim 13, wherein the controller is further configured to turn off the pumping cell before providing the pulse-width-modulated signal to the heater in one of the plurality of stages.

16. The system of claim 12, wherein controller is configured to create the pulse-width-modulated signal by accessing a look-up table that maps the predetermined temperature for the stage to a corresponding internal resistance of the measurement cell.

17. The system of claim 12, further comprising an engine controller coupled to the controller and configured to instruct the controller to clean the oxygen sensor.

18. The system of claim 12, further comprising a resistance detecting unit configured to detect an internal resistance of the measurement cell and to transmit the detected internal resistance to the controller.

* * * * *